United States Patent Office 3,439,813
Patented Apr. 22, 1969

3,349,813
DEVICE FOR POSITIONING AND HOLDING
John J. Drumm, Bloomfield Hills, and Matthew C. Najmowicz, Detroit, Mich., assignors to Ford Motor Company, Dearborn, Mich., a corporation of Delaware
Filed Nov. 29, 1967, Ser. No. 686,396
Int. Cl. B23q 3/08; B25j 3/00
U.S. Cl. 214—1                                    2 Claims

ABSTRACT OF THE DISCLOSURE

A multi-station, multi-fixture means for assembling objects such as motor vehicle bodies comprising a device for positioning and holding an object including upright trunnions about a holding zone, horizontally pivotable clamp supporting means mounted on said trunnions and having a cam track formed therein, clamping means mounted on said clamp support means, vertically reciprocal drive means mounted on said trunnions, cam follower means riding on said cam track and operatively connected to said drive means, and locating means which position the object within said holding zone with respect to three predetermined and mutually perpendicular planes.

---

This invention relates to improvement in method and means for manufacturing frame or shell-like objects such as motor vehicle bodies. In particular, this invention relates to a novel work holding device and is especially concerned with embodiments thereof which are adapted to hold a motor vehicle body in fixed position to facilitate work thereon. More particularly, this invention relates to a novel device for gripping and holding the several preformed parts of a tenuously assembled motor vehicle body in proper position and relation for welding and to the use of such device to assure weld uniformity and to provide bodies of greater strength and dimensional integrity.

It is one object of this invention to provide an improved method and means for holding motor vehicle bodies in assembled relationship for work thereon whereby multiple welding may be carried out upon the body assembly with assurance of uniformly effective welds without distortion of the unitized product.

It is another object of this invention to provide an improved locating and holding device for use in the welding together of tenuously assembled parts of a motor vehicle body including automatic transfer means for loading said device when a welded product thereof has exited therefrom.

It is another object of this invention to provide an improved locating and holding device for use in the welding together of tenuously assembled parts of a motor vehicle body wherein the motion of the body assembly entering the holding device actuates body locating means which locate and hold said body within a holding zone between oppositely disposed, horizontally pivotable clamping means and in a predetermined position with respect to three predetermined and mutually perpendicular planes while said clamping means are withdrawn from said zone.

With the foregoing and other objects in view which will be made manifest in the following detailed description and specifically pointed out in the appended claims, reference is had to the accompanying drawings for an illustrative embodiment of the invention wherein:

Referring now particularly to FIGURES 1, 2, 3 and 4, the fixture of station 1 comprises a lower frame assembly 11 and an upper frame assembly 13 fixedly mounted thereon.

Figure 1:
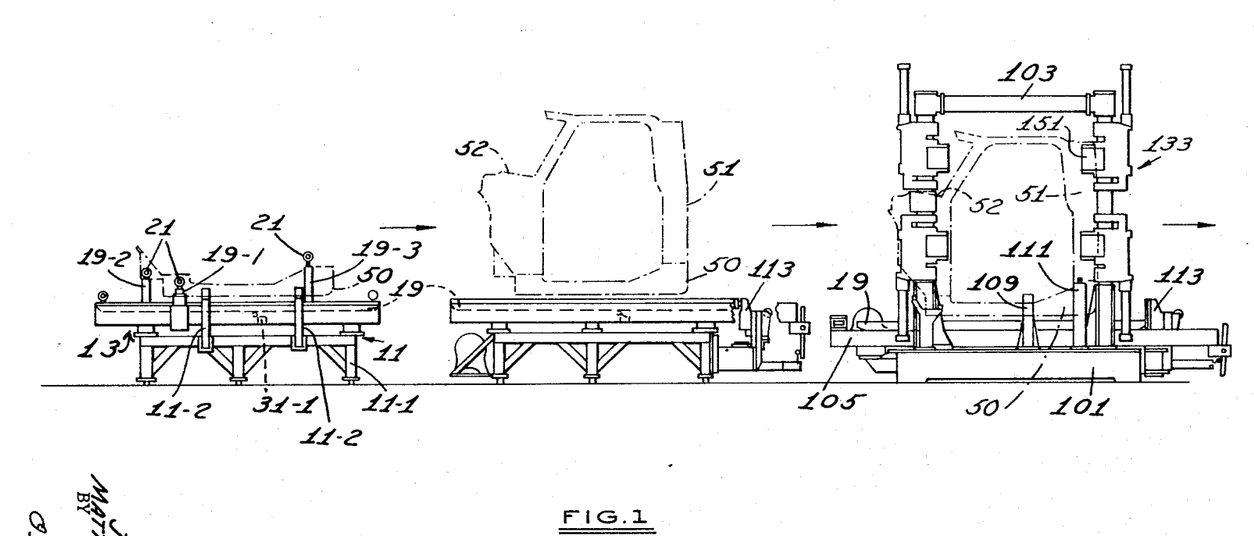
FIGURE 1 is a semidiagrammatic side view of 4 stations of a multi-station framing assembly.
Figure 2:
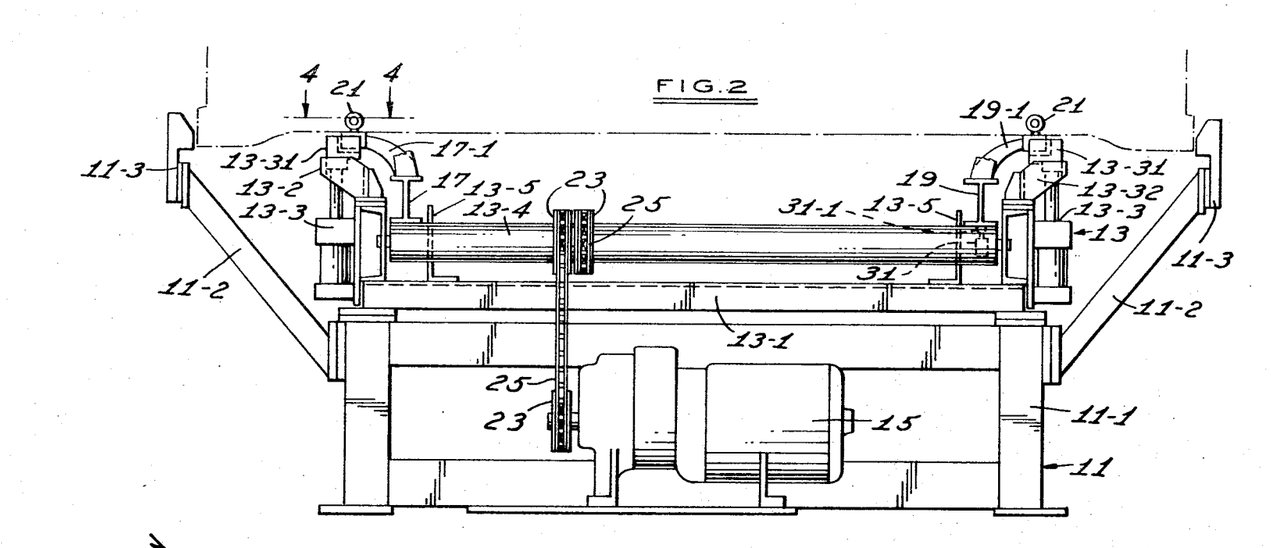
FIGURE 2 is an end elevation view of the fixture of station 1 of FIGURE 1 as viewed from left to right in FIGURE 1 showing skids for loading and transport, skid locating means, body locating means, and drive means for transporting a loaded skid to the next station.
Figure 3:
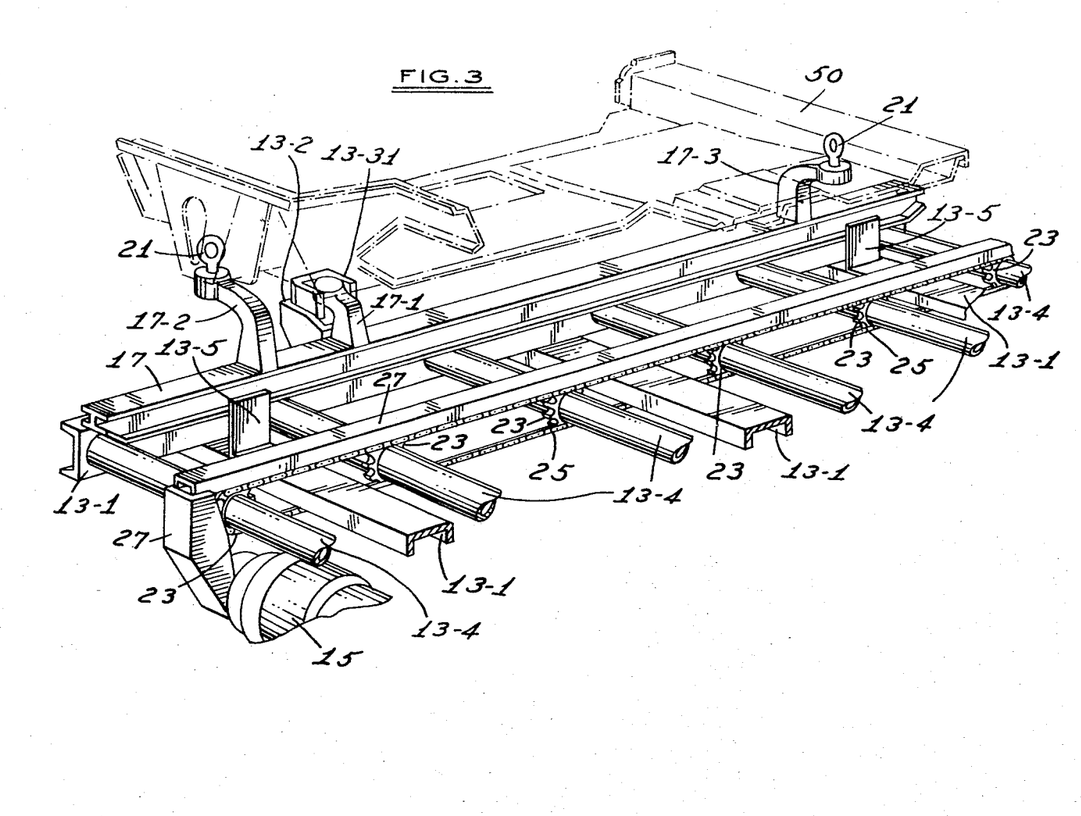
FIGURE 3 is a fragmentary perspective view of the fixture of station 1 showing a truck floor pan, mounting means on a skid and a different view of the drive means for transporting the loaded skid to the next station.

Lower frame assembly 11 comprises a base 11–1 upon which are mounted a plurality of outrigger guide arms 11–2. Mounted on the projecting end of each of the guide-arms 11–2 are work locators 11–3 for lateral postitioning of a work load. Mounted on base 11–1 of lower frame assembly 11 is an electric motor 15.

Upper frame assembly 13 comprises a stationary frame 13–1. Mounted on frame 13–1 are a pair of vertically reciprocal locator assemblies 13–3 and a plurality of drive rolls 13–4.

Figure 4:
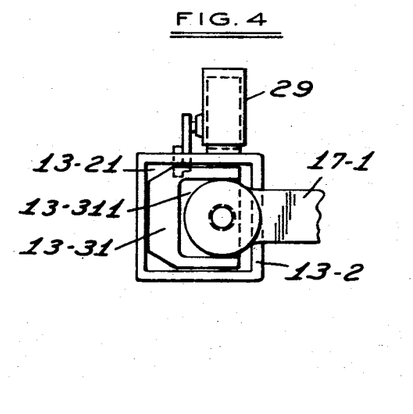
FIGURE 4 is a fragmentary view indicated by line 4—4 on FIGURE 2 showing the skid locator in detail and associated limit switch.

Locator assemblies 13–3 comprise air or hydraulically operated cylinders with skid locator means 13–31 secured to the projecting end of the piston rod thereof. Locator means 13–31 pass through openings 13–21 in guide arms 13–2.

Before loading the fixture with a floor pan assembly, a pair of skids 17 and 19 are positioned on the fixture resting upon rollers 13–4. Skids 17 and 19 each have rigidly affixed thereto outrigger locator arms 17–1 and 19–1 respectively. Locator arms 17–1 and 19–1 rest in openings 13–311 of the corresponding units of locator means 13–31.

A motor vehicle floor pan assembly 50, in this embodiment the floor pan for a truck cab, is shown in FIGURE 3 and in broken outline in FIGURE 2. The floor pan is secured to skids 17 by bolts 21 threadably engaged in skid outrigger attachment arms 17–2 and 17–3. Outrigger attachment arms 17–2 and 17–3, shown in FIGURE 3, are mounted on skid 17. Skid 19 is equipped with corresponding attachment arms, not shown.

Skid guides 13–5 are mounted on frame 13–1 and prevent lateral movement of skids 17 and 19 on the fixture.

Each of the drive rolls 13–4 have mounted thereon a pair of sprocket wheels 23 by which the rolls 13–4 are interconnected and driven via continuous chains 25 and motor 15. Chains 25 are protected by chain guard 27.

Mounted on one of the skid locator guide arms 13–2 is a limit switch 29 which is actuated by movement of skid locator means 13–31 to its lower position. Limit switch 29, when actuated, causes motor 15 and the operatively connected drive rolls 13–4 to start thereby transporting skids 17 and 19 and attached floor pan assembly 50 to the next station.

A limit switch in station 2 is depressed by the weight of a workload therein and prevents actuation of motor 15 of station 1 when station 2 is occupied. This switch is not shown but is a conventional, contact actuated, limit switch and serves the same purpose as limit switch 117 of station 4, shown in FIGURE 9, serves with respect to the motor in station 3.

Locator means 13–31 are normally in the upper position and are retracted upon actuation of the cylinder of locator assemblies 13–3. Locator assemblies 13–3 are operator actuated by electrical control means, not shown. When locator means 13–31 are lowered, limit switch 29 is actuated starting motor 15 causing rotation of rolls 13–4 and transfer of skids 17 and 19 with their load to the next station.

A limit switch 31 is mounted on frame 13–1 and has a trigger arm 31–1 which is depressed by the weight of skid 19. When skid 19 is transferred from station 1 to station 2, it moves away from trigger arm 31–1 and the pressure previously exerted to depress trigger arm 31–1 is released. Actuation of limit switch 31 by release of such pressure stops motor 15 and the resultant rotation of drive rolls 13–4. By positioning limit switch 31 at the upstream end of the fixture of station 1 or by incorporating conventional time delay means in this circuit, motor 15 is permitted to operate until the skids 17 and 19 either have been fully removed from station 1 or have moved until engaged by corresponding drive rolls of the fixture at station 2.

When locator arms 17–1 and 19–1 pass from locator means 13–31 upon movement of skids 17 and 19, locator means 13–31 move back to their upper position by spring means, not shown, upon actuation of limit switch 31.

At station 1, the skids are located on the fixture, the floor pan 50 is secured to the skids and a sealer compound applied to desired portions of the floor pan assembly. The sealer compound is used in later union of the floor pan with the back panel and front body sub-assembly of a truck cab which are loaded at station 2.

The fixtures at stations 2 and 3 are substantially identical with the fixture hereinbefore described at station 1. The fixture at station 2 differs from that of station 1 in that the fixture of station 2 has a stop locator which replaces locator assembly 13–3 of FIGURES 2 and 4. The stop locator of station 2 is identical with the movable skid stop means shown in FIGURES 6 and 7. The fixture of station 3 differs from that of station 2 only in the arrangement whereby motion to its drive rolls is initiated. The motor for providing movement of drive rolls and skids on the fixture of station 2 to transfer the loaded skids from station 2 to station 3 is operator actuated in this embodiment by a conventional electric circuit. This movement is actuated after the loading operation at station 2 is completed if station 3 is empty. Station 2, like station 1, is equipped with safety means which prevents actuation of the drive motor of station 2 if the fixture of station 3 is loaded.

At station 2 a back panel 51 and a front body sub-assembly 52 are positioned to the floor pan and hand clamped in position.

Figure 9:
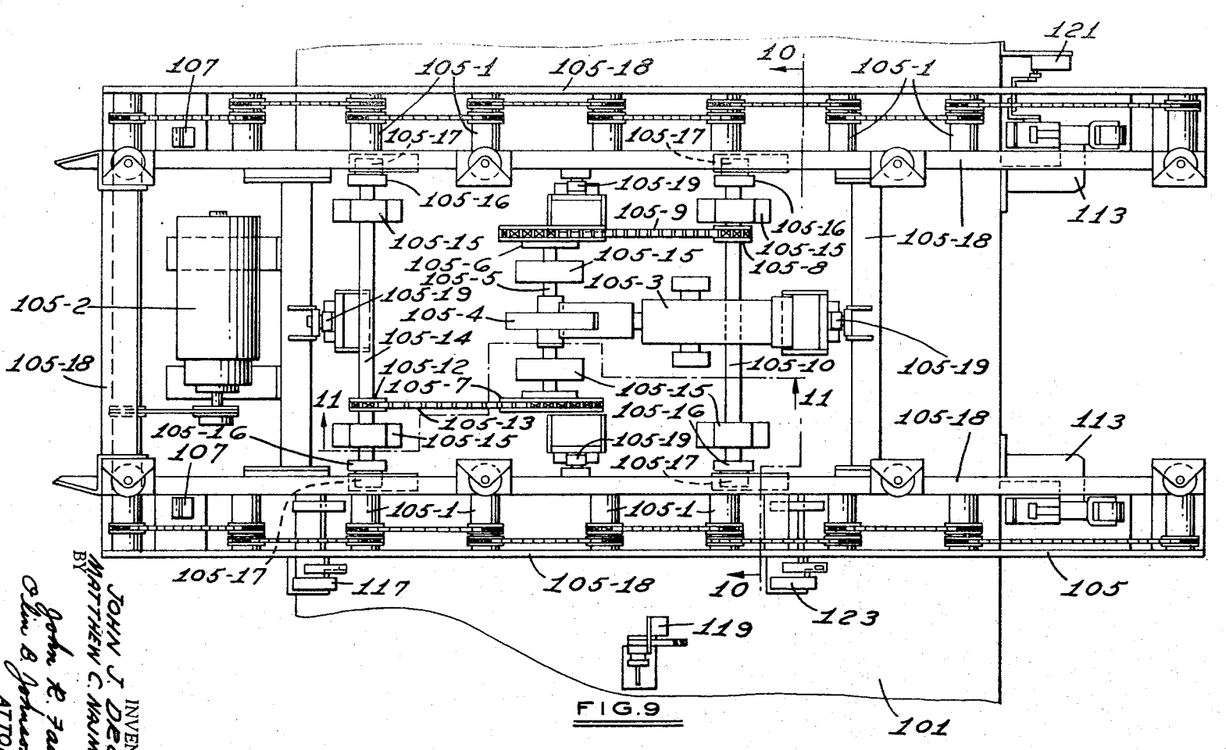
FIGURE 9 is a schematic top view of the lift means of the fixture of station 4.

Station 3 is an idle station for holding the body assembly product of station 2 and for automatic feeding of such assembly to the body framing fixture of station 4 when the latter is empty. No work functions are performed upon such assembly in this embodiment while the assembly is in station 3. Movement of the drive rolls of station 3 is actuated by release of limit switch 117 on the fixture of station 4 which indicates that station 4 has been evacuated.

Referring now to FIGURES 5, 6, 7, 8, 9, 10, 11 and 12, the partially assembled truck cab affixed to skids 17 and 19 is passed to the body framing fixture of station 4.

Figure 5:
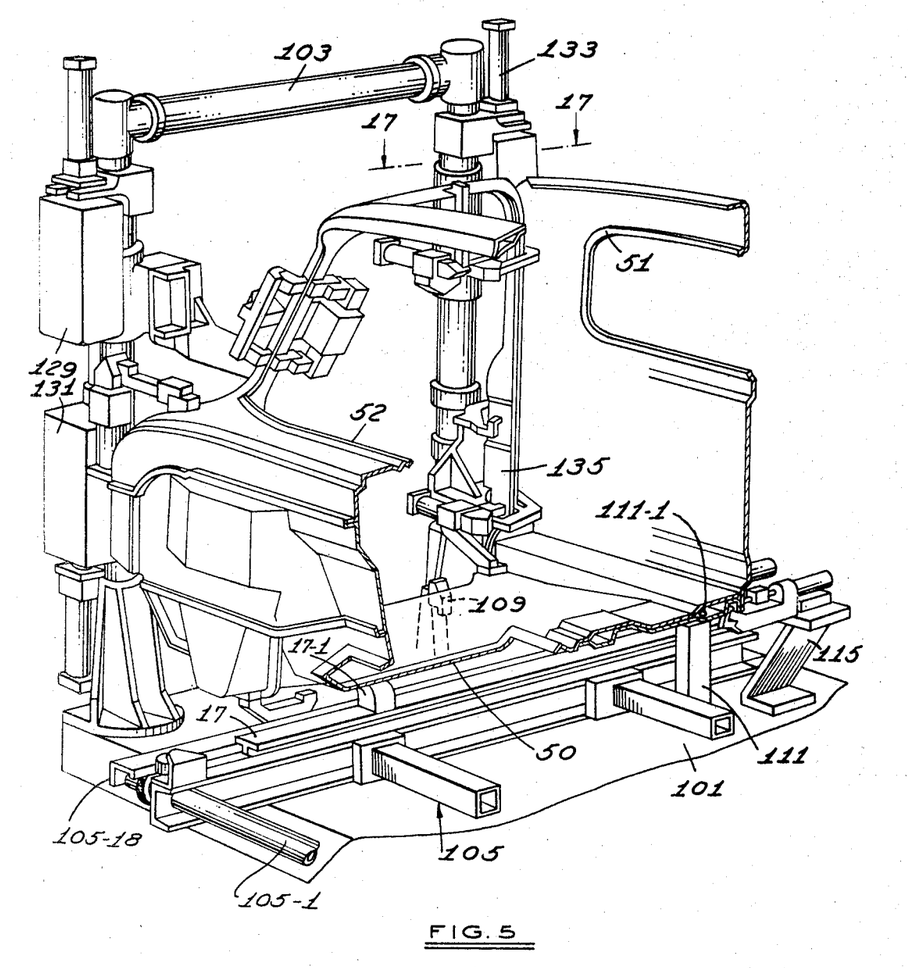
FIGURE 5 is a fragmentary perspective view of the body framing fixture of station 4 showing clamping means, trunnions for supporting the clamping fixtures, skid, drive rolls, and welding means operatively connected to a stationary base.

The body framing fixture of station 4 comprises a base plate 101, a tubular mounting frame 103 mounted on and supported by base plate 101, a lift table 105 mounted on and supported by base plate 101, stationary skid guides 107, stationary body locators 109, floor pan locator and supports 111, movable skid stop means 113, automatic weld unit 115, limit switches 117, 119, 121, 123, 125 and 127, and pivotable gate and clamping units 129, 131, 133 and 135.

Stationary skid guides 107, stationary body locators 109, floor pan locators and supports 111, movable skid stop means 113, automatic weld unit 115, and limit switches 119, 121, 125 and 127 are mounted on base plate 101. Limit switch 119 has a duplicate limit switch, not shown, which is also mounted on base plate 101 on the opposite side of lift table 105 directly opposite limit switch 119.

Limit switch 117 and limit switch 123 are mounted on lift table 105.

Figure 10:
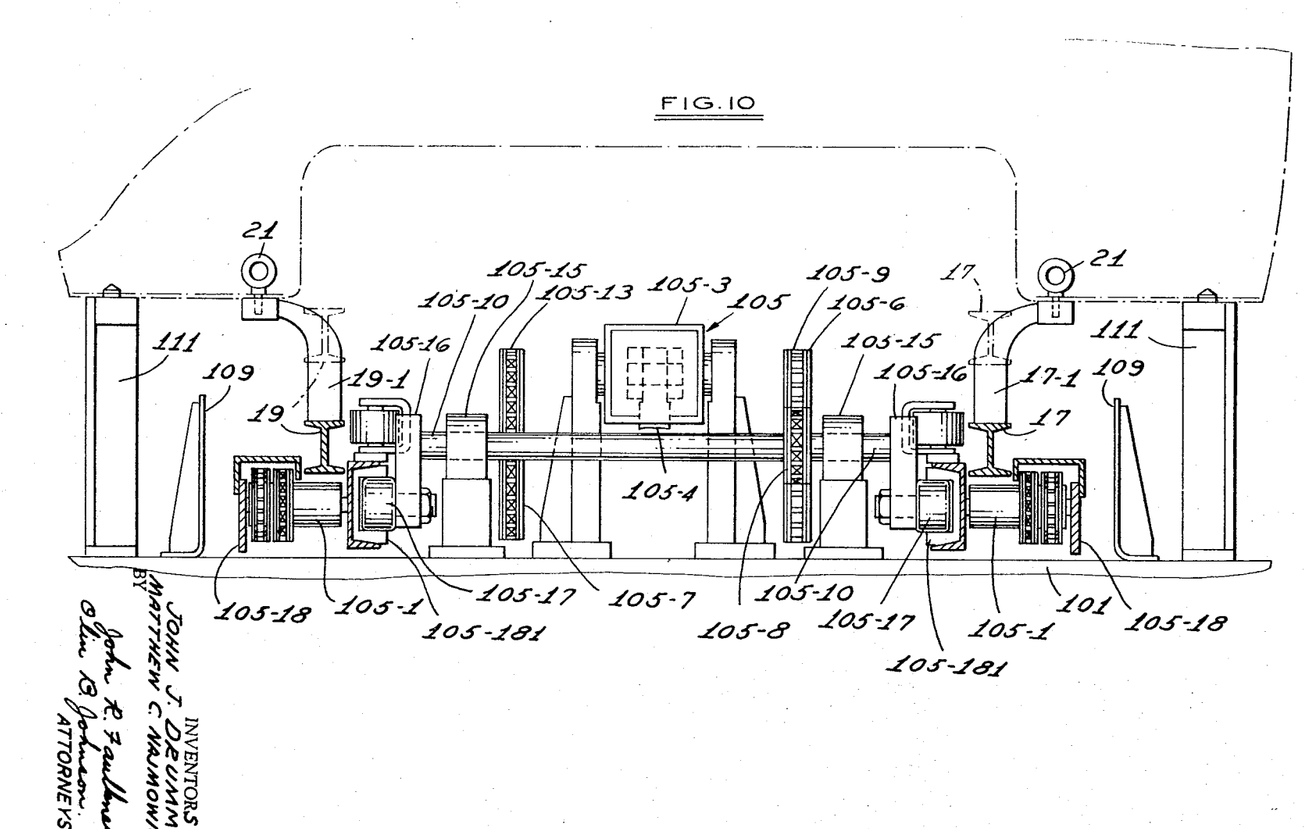
FIGURE 10 is a cross sectional view taken along line 10—10 of FIGURE 9 showing lift means, skids and the skid load in the lowered position.

Upon entering the fixture of station 4, the skids 17 and 19 supporting the partially assembled truck cab contact and move forward on drive rolls 105–1 of lift table 105 depressing in turn limit switches 117 and 123. Drive rolls 105–1 are power driven by motor 105–2.

The work retaining portion of lift table 105 is movable between an upper loading position and a lower work position as indicated by the phantom and solid sectional views of skids 17 and 19 in FIGURE 10. Depression of limit 123 serves to stop motor 105–2 and rollers 105–1 and to lower lift table 105. Limit switch 123 is interconnected with a time delay circuit which postpones such actions until skids 17 and 19 reach movable skid stop means 113.

Figure 11:
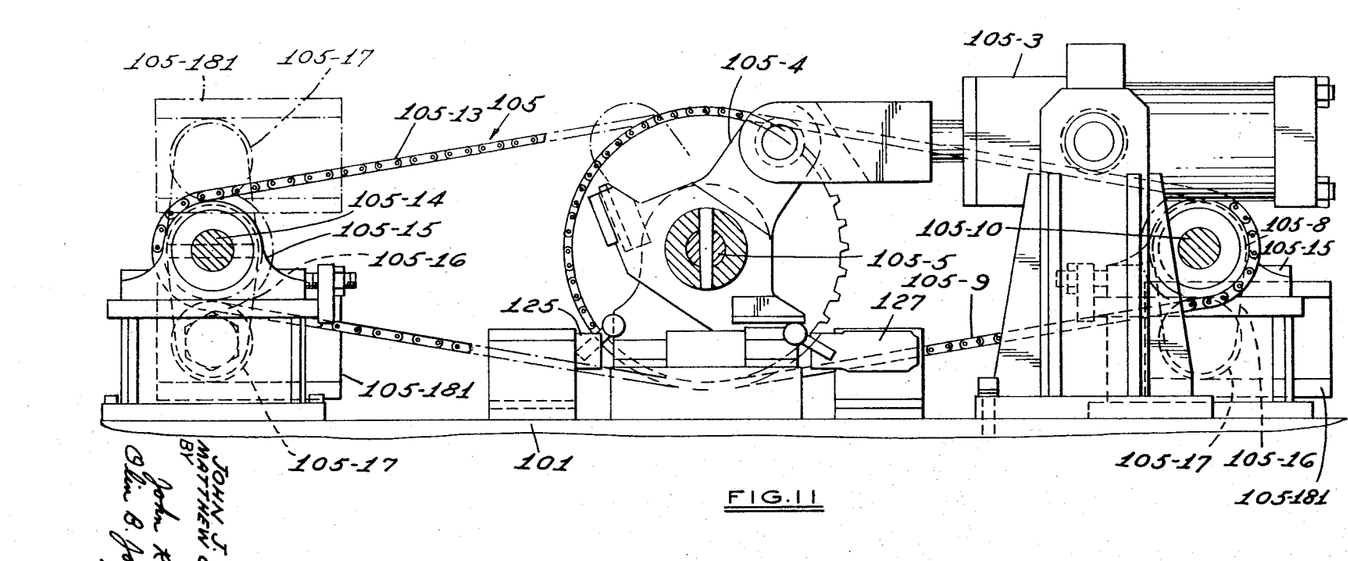
FIGURE 11 is a sectional view taken along line 11—11 of FIGURE 9 showing the drive mechanism of the lift means and associated limit switches.
Figure 12:
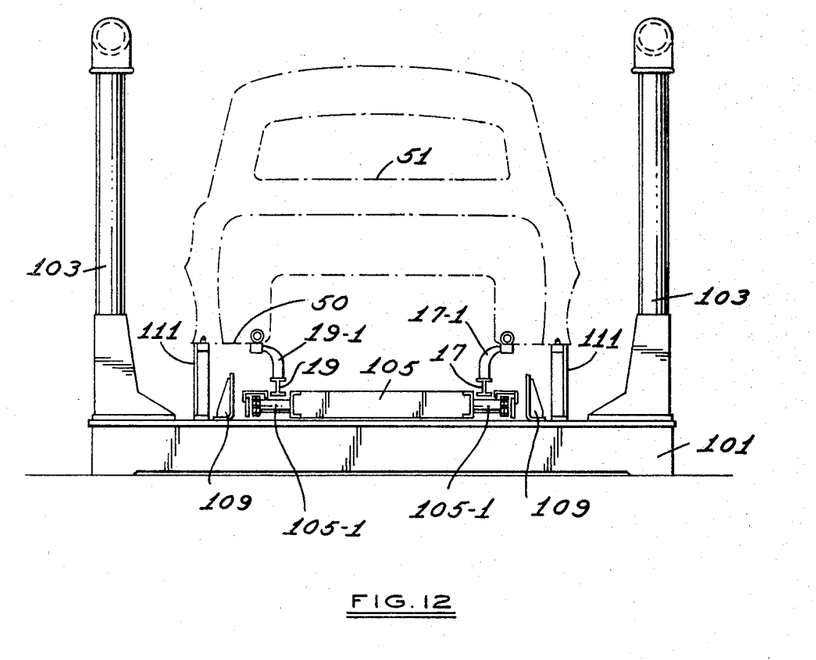
FIGURE 12 is a fragmentary schematic end view of the fixture of station 4 showing a loaded skid, skid support means and trunnions for supporting the body clamping fixtures.

Lift table 105 is operated by a hydraulically powered cylinder 105–3 which is pivotally attached to a lever arm 105–4. Lever arm 105–4 is fixedly secured to shaft 105–5. Shaft 105–5 passes through and is fixedly secured to sprockets 105–6 and 105–7.

Sprocket 105–6 is operatively connected to sprocket 105–8 by chain 105–9. Shaft 105–10 passes through and is fixedly secured to sprocket 105–8. Sprocket 105–7 is operatively connected to sprocket 105–12 by chain 105–13. Shaft 105–14 passes through and is fixedly secured to sprocket 105–12. Shafts 105–5, 105–10 and 105–14 are held in position by stationary blocks 105–15. Shafts 105–10 and 105–14 each have fixedly secured at opposite ends thereof roller retainer and elevator control arms 105–16. Cam rollers 105–17 are fixedly secured to arms 105–16. Cam rollers 105–17 move on and rotate with cam blocks 105–181 of frame 105–18. The rotation of shafts 105–5, 105–10 and 105–14 rotate arms 105–16 and cam rollers 105–17 to raise or lower lift table frame 105–18 between its upper load position and its lower work position.

Rolls 105–1, motor 105–2, limit switches 117 and 123 are mounted on lift table frame 105–18.

Guides 105–19 prevent fore and aft and lateral movement of lift table frame 105–18 when lift table frame 105–18 is being raised and lowered.

Figure 8:
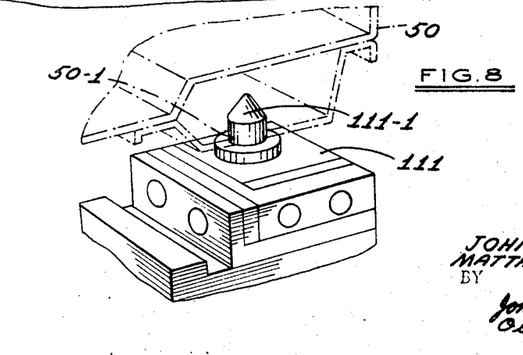
FIGURE 8 is a fragmentary perspective view of one of the body locating means in station 4.

In the bottom of the floor pan a tapered number of preformed openings 50–1 correspond to the number of locator pins 111–1 and pan locators and supports 111.

When lift table frame 105–18 reaches its lowermost position, locator pins 111–1 slide through openings 50–1 preventing lateral or fore and aft movement of the work load, and lever arm 105–4 activates limit switch 125 which initiates the closing movement of gate units 129, 131, 133 and 135.

The gate units 129, 131, 133 and 135 constitute the left side units viewed from downstream in the framing process. Symmetrically opposite corresponding right side units, not shown, are positioned opposite the units shown in FIGURE 5.

The clamping units mounted on and supported by each of the gate units are individually designed to be moved into position and to grip the desired portions of the workpiece being processed. Except for oppositely aligned cam tracks, the gate units 129, 131, 133 and 135 are identical. Units 129 and 135 are identically constructed. Unit 129 is mounted with the operating cylinder above the pivoting unit while 135 is reversely mounted with the operating cylinder below the pivoting unit. Units 131 and 133 are identically constructed and differ in construction from units 129 and 135 only in that their cam tracks are oppositely aligned with respect to the cam tracks of units 129 and 135. Unit 133, like unit 129, is mounted with the operating cylinder above the pivoting unit. Unit 133 is used to illustrate the construction and operation of all such units.

Figures 13, 15, 16:
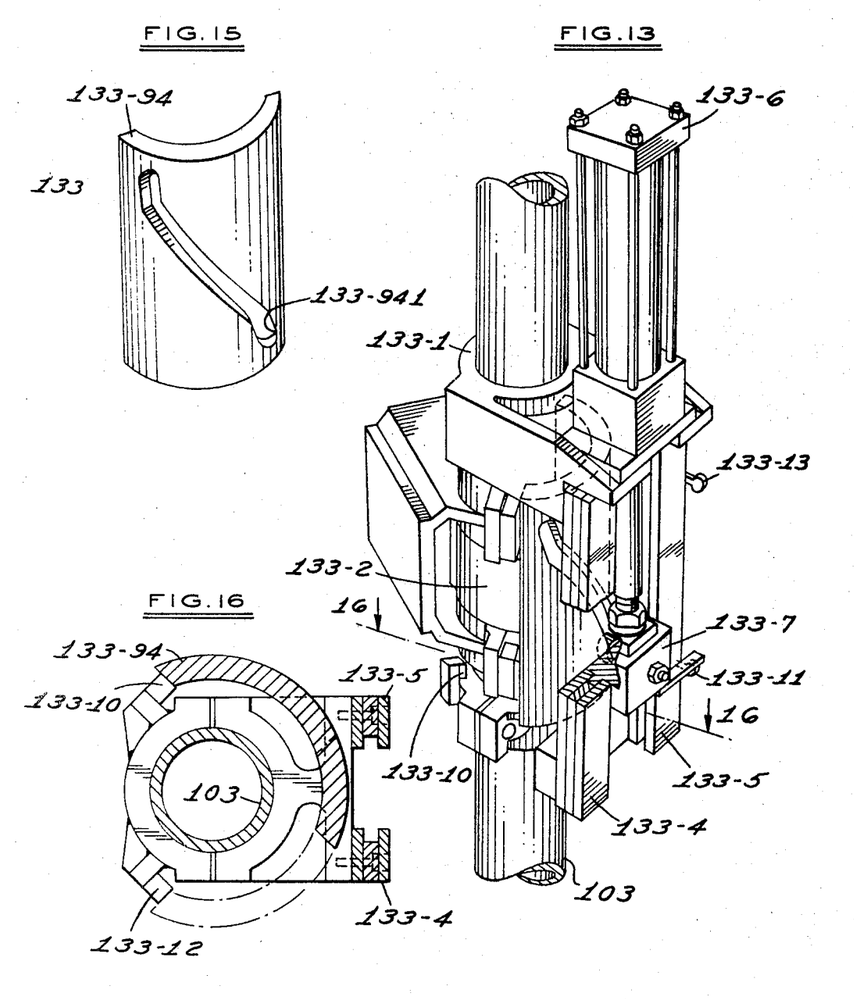
FIGURE 13 is a fragmentary perspective view of a trunnion shown in FIGURE 12 and pivotable clamp support means for rotating clamping means mounted thereon between inner clamping and outer rest positions.
FIGURE 15 is a perspective view of the cam plate of FIGURE 13 and the cam track formed therein.
FIGURE 16 is a sectional view taken along line 16—16 of FIGURE 13 showing the stop means which terminate the pivoting motion of the clamp support means.
Figure 14:
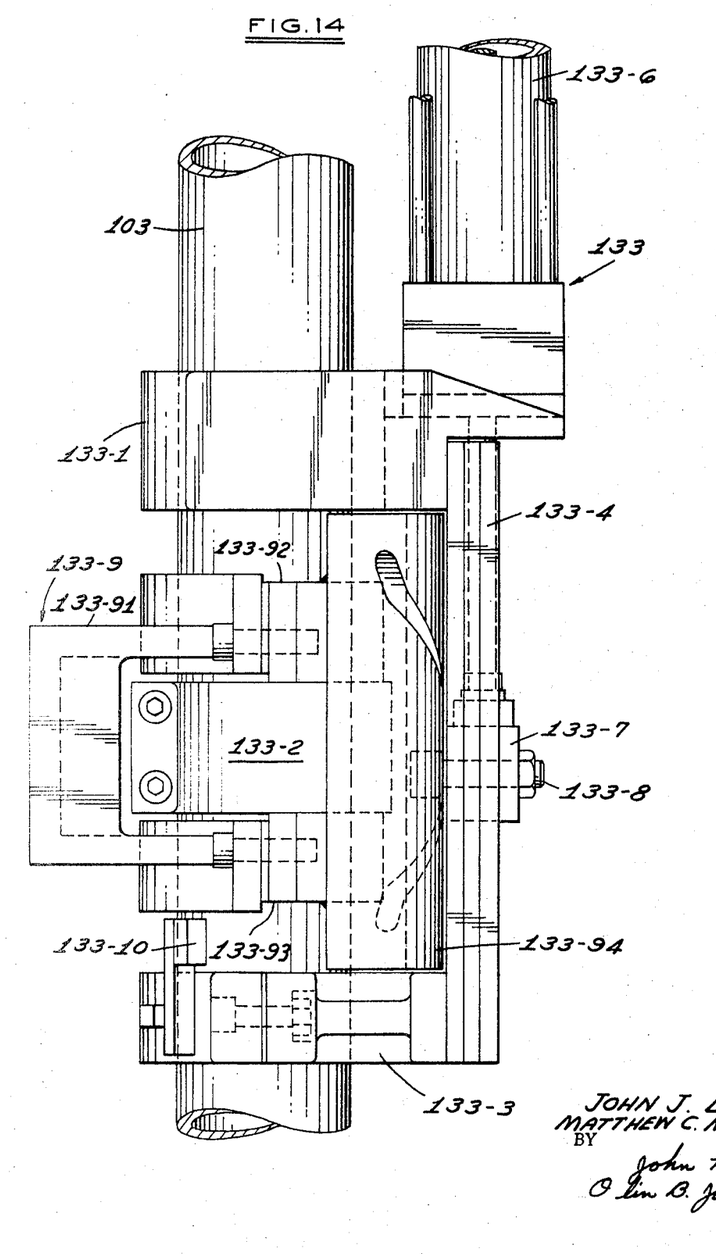
FIGURE 14 is a fragmentary side elevation view of apparatus shown in FIGURE 13.

Gate unit 133 comprises a first stationary collar 133–1, a second stationary collar 133–2 and a third stationary collar 133–3 which are mounted on and fixedly secured to tubular mounting frame 103. Secured to and extending between collars 133–1 and 133–3 are a matched pair of stationary guides 133–4 and 133–5. A hydraulically operated cylinder 133–6 is operatively connected with a vertically reciprocal crosshead 133–7 which rides between stationary guides 133–3 and 133–4 and supports a cam follower 133–8.

Pivotable gate unit 133–9 comprises clamp assembly support bracket 133–91, pivotable collars 133–92 and 133–93, and curved cam plate 133–94 having a cam track 133–941 formed therein. Pivotable collars 133–92 and 133–93 are pivotably mounted on tubular mounting frame 103. They are secured to and support clamp assembly support bracket 133–91 and cam plate 133–94. Vertical position of pivotable collars 133–92 and 133–93 is effected by stationary collar 133–2.

With the piston of cylinder 133–6 retracted cam follower 133–8 is in its upper position with respect to cam track 133–941 and pivotable gate unit 133–9 is in the open or rest position.

When lift table frame 105–18 reaches its lowermost position, lever arm 105–4 activates limit switch 125 which activates operating cylinder 133–6 providing downward movement of the piston rod thereof. Downward movement of the piston rod of operating cylinder 133–6 forces crosshead 133–7 downward between guides 133–4 and 133–5 causing cam follower 133–8 to ride down in cam track 133–941 providing rotation of pivotable gate unit 133–9 until stop 13–10 is contacted by curved cam plate 13–94. Such movement pivots the clamp assembly mounted on clamp assembly support bracket 133–91 into position for clamping the workpiece. In this embodiment clamp assembly support bracket 133–91 pivots through 90° but may be adjusted to pivot through a lesser or greater angle for a particular operation.

Clamping may be initiated by operator control or automatically upon closure of the gates which actuates limit switch 133–11. When all clamps are closed manual and/or automatic welding together of floor pan 50, back panel 51 and front body sub-assembly 52 is effected. Automatic welding is indicated in FIGURE 5 by automatic weld means 115.

After welding operations upon the workpiece are completed, operator activates controls to open clamps and initiate opening of the pivotable gate units. In the opening movement of the pivotable gate units, the piston rod of cylinder 133–6 is retracted raising crosshead 133–7 and cam follower 133–8. The upward movement of cam follower 133–8 in cam track 133–941 causes pivotable gate unit 133–9 to swing to its open position against stop 133–12. Near the termination of such movement, crosshead 133–7 activates limit switch 113–13. Activation of limit switch 113–13 initiates upward movement of lift table frame 105–18. As lift table frame 105–18 reaches its uppermost position, lever arm 105–4 actuates limit switch 127 which lowers movable skid stop means 113. The lowering of stop means 113 actuates limit switch 121 which starts motor 105–2 causing rotation of drive rolls 105–1 transferring welded unit out of the body framing fixture of station 4.

The clamping units shown in FIGURES 17, 18, 19 and 20 are illustrative of clamping fixtures that may be used with this framing picture. They are here shown in closed or clamping position upon different portions of a truck cab.

Figures 6, 20:
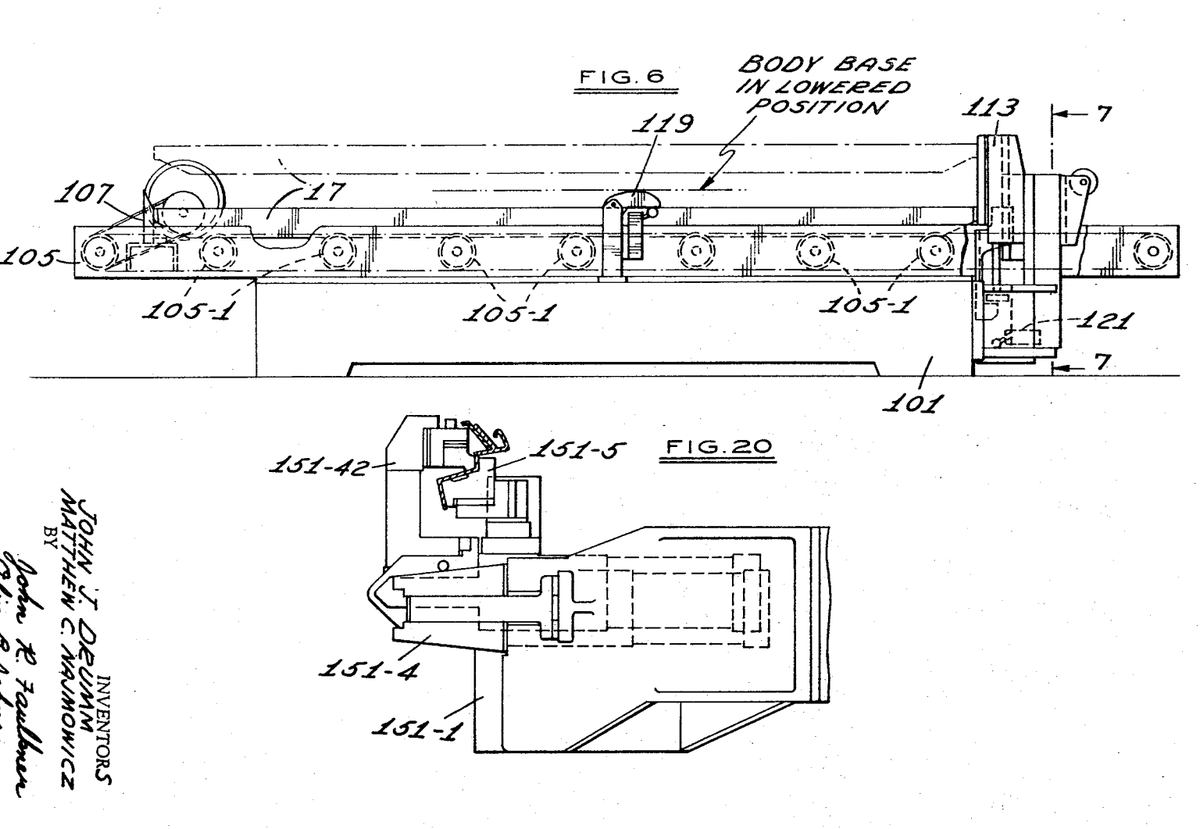
FIGURE 6 is a side elevation view of the drive rolls, skid and stop members of the fixture of station 4.
FIGURE 20 is a view taken along line 20—20 of FIGURE 17.
Figure 7:
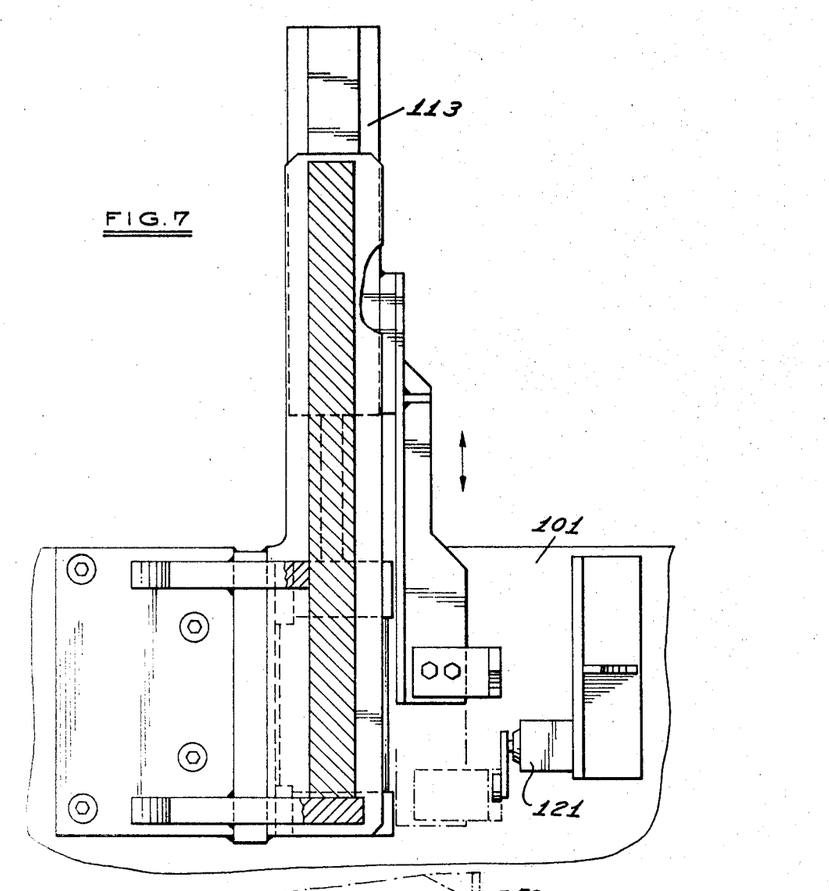
FIGURE 7 is a sectional view along line 7—7 of FIGURE 6 showing movable stop means which terminate forward movement of skids entering the fixture and associated limit switch.
Figure 17:
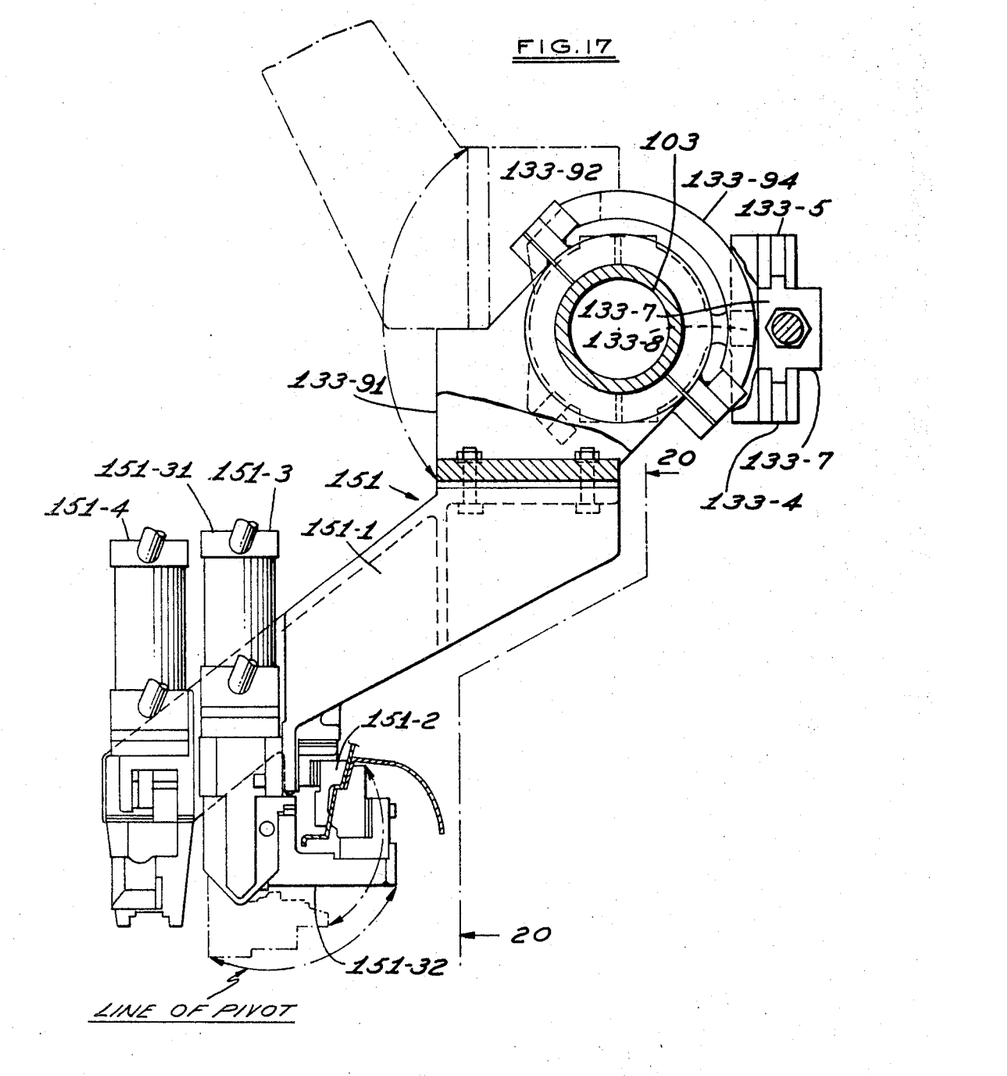
FIGURE 17 is a view substantially along line 17—17 of FIGURE 5.
Figures 18, 19:
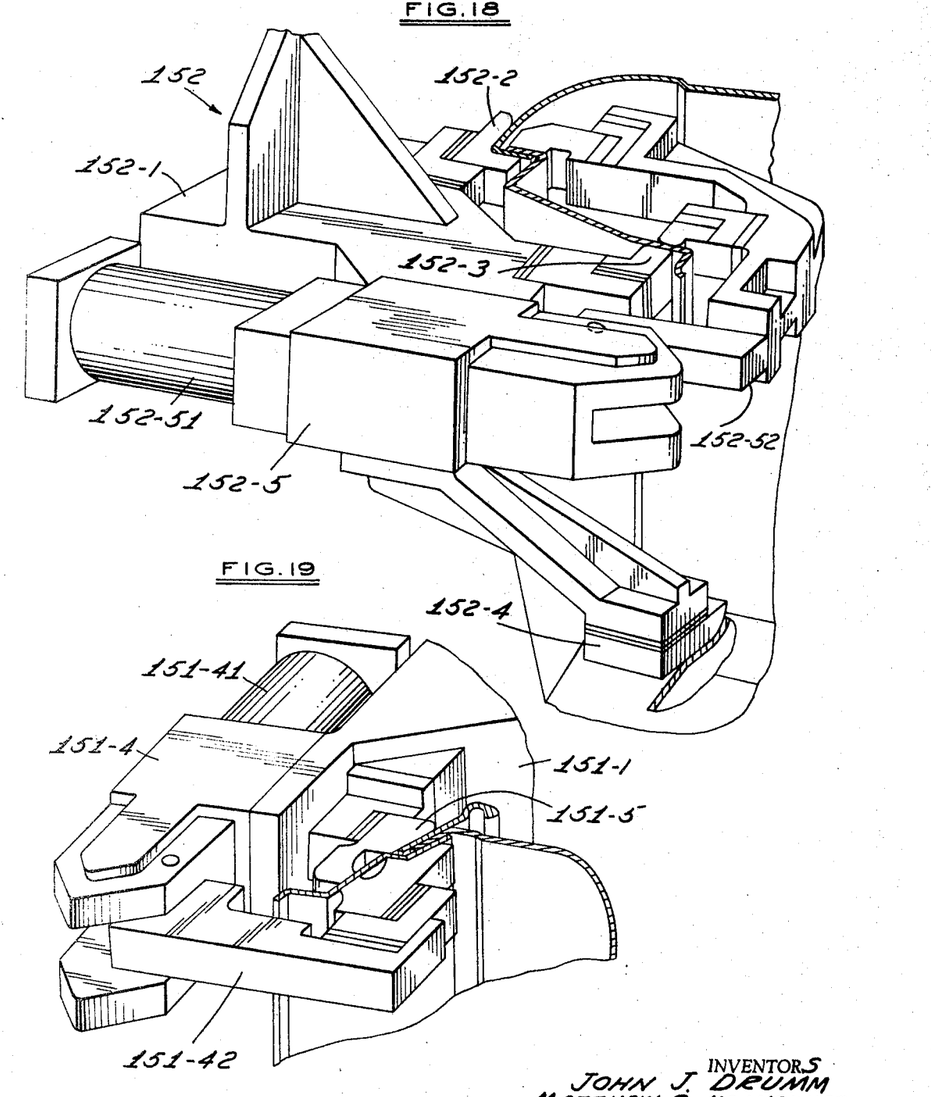
FIGURE 18 is a perspective view of a lower clamping fixture.
FIGURE 19 is a fragmentary view of an upper clamping fixture.

The clamping unit 151 in FIGURE 17 comprises a bracket 151–1 secured to clamp assembly support bracket 133–91, locator 151–2 secured to bracket 151–1, and air actuated power clamp units 151–3 and 151–4 secured to bracket 51–1. Clamp unit 151–3 comprises an air cylinder unit 151–31 and a clamp 151–32 which is pivotably connected to air cylinder unit 151–31. Clamp unit 151–4 is also shown in FIGURES 19 and 20 and comprises an air cylinder unit 151–41 and a clamp 151–42 which is pivotably connected to air cylinder unit 151–41. Clamping unit 151–4 cooperates with locator 151–5 shown in FIGURES 19 and 20 when closing upon the workpiece. Locator 151–5 is secured to bracket 151–1.

The clamping unit 152 in FIGURE 18 comprises a bracket 152–1 secured to clamp assembly support bracket 133–91, locators 152–2, 152–3, and 152–4, and air actuated power clamp unit 152–5 all of which are secured to bracket 152–1. Clamp unit 152–5 comprises an air cylinder unit 152–51 and a clamp 152–52 which is pivotably connected to air cylinder unit 152–51.

Conversion of the body framing fixture of station 4 for the processing of similar but somewhat different workpieces can be effected through relatively minor changes such as changes in the design and positioning of the clamping means mounted on the pivoting gate units.

Additional upstream assembly stations are employed as required. Ordinarily, an idle station similar to station 3 is employed immediately after station 4. A load depressed limit switch in this station prevents evacuation of the fixture of station 4 if the next station has not been emptied.

It will be understood that conventional switching and connecting devices, not shown, are employed between the various units hereinbefore described to implement and carry out the functions of such units as hereinbefore described. Such devices include, but not by way of limitation, conductors, insulators, pressure switches, electrical relays, power means, equipment protective devices, etc.

The foregoing detailed description of the embodiments shown in the drawings is submitted solely for purposes of illustration. Those skilled in the art will be aware that numerous modifications can be made in the aforedescribed methods and means without departing from the spirit of the invention as expressed in the claims.

We claim:
1. A device for positioning an object and holding said object in the resultant position comprising in combination:
(a) a plurality of rigid, upright trunnions spaced apart and fixedly positioned along opposite sides of the holding zone,
(b) horizontally pivotable clamp support means pivotably mounted on said trunnions and having a cam track formed therein,
(c) clamping means movable with and supported by said pivotable clamp support means,
(d) vertically reciprocal drive means mounted on said trunnions,
(e) cam follower means riding on said cam track and operatively connected to said vertically reciprocal drive means,
   said drive means upon being reciprocated moving said cam follower means along said cam track and forcing said horizontally pivotable clamp support means to pivot between a first position wherein said clamping means are in clamping position and a plurality thereof substantially defined a perimeter of a holding zone and a second position wherein said clamping means are in a rest position outside said holding zone which admits of entry of said object into said holding zone and exit of the same therefrom,
(f) locating means constructed and arranged to receive and locate said object within said holding zone in a predetermined position with respect to three predetermined and mutually perpendicular planes while said clamping means are withdrawn from said clamping position,
   said object when in said predetermined position being positioned to receive and to be gripped by said clamping means when said pivotable clamp supporting means are moved into said first position, and
(g) clamp actuating means for opening and closing said clamping means when said clamping means are in said clamping position.

2. A device for positioning an object and holding said object in the resultant position comprising in combination:
(a) a plurality of rigid, upright trunnions spaced apart and fixedly positioned along opposite sides of a holding zone,
(b) horizontally pivotable clamp support means pivotably mounted on said trunnions and having a cam track formed therein,
(c) clamping means movable with and supported by said pivotable clamp support means,
(d) vertically reciprocal drive means mounted on said trunnions,
(e) cam follower means riding on said cam track and operatively connected to said vertically resiprocal drive means,
   said drive means upon being reciprocated moving said cam follower means along said cam track and forcing said horizontally pivotable clamp support means to pivot between a first position wherein said clamping means are in clamping position and a plurality thereof substantially define a perimeter of a holding zone and a second position wherein said clamping means are in a rest position outside said holding zone which admits of entry of said object into said holding zone and exit of the same therefrom,
(f) locating means constructed and arranged to receive and locate said object within said holding zone in a predetermined position with respect to three predetermined and mutually perpendicular planes while said clamping means are withdrawn from said clamping position,
   said object when in said predetermined position being positioned to receive and to be gripped by said clamping means when said pivotable clamp supporting means are moved into said first position,
(g) clamp actuating means for opening and closing said clamping means when said clamping means are in said clamping position, and
(h) transfer means external to said holding zone and actuated by exit of said object from said holding zone for propelling a workpiece into said holding zone.

References Cited
UNITED STATES PATENTS

| | | | |
|---|---|---|---|
| 2,206,791 | 7/1940 | Sherrod | 269—27 |
| 2,277,631 | 3/1942 | Bullock | 269—27 X |

GERALD M. FORLENZA, *Primary Examiner.*

G. F. ABRAHAM, *Assistant Examiner.*

U.S. Cl. X.R.

269—25